SOLID-STATE PHOTODIODE AND TRANSISTOR ENCAPSULATED ASSEMBLY

Filed March 24, 1967

INVENTOR
JEAN-CLAUDE ADAM CHAIMOWICZ
BY- Hood, Gust and Irish,
ATTORNEYS.

United States Patent Office 3,475,617

Patented Oct. 28, 1969

3,475,617

SOLID-STATE PHOTODIODE AND TRANSISTOR ENCAPSULATED ASSEMBLY

Jean-Claude Adam Chaimowicz, Greenford, England, assignor to Mining & Chemical Products Limited, Alperton, Wembley, Middlesex, England, a corporation of Great Britain Filed Mar. 24, 1967, Ser. No. 625,682
Claims priority, application Great Britain, Mar. 31, 1966, 14,341/66
Int. Cl. H01j *39/12, 5/02*
U.S. Cl. 250—239 7 Claims

ABSTRACT OF THE DISCLOSURE

A photoelectric receiving device having a photodiode and an amplifier mounted in a housing so as to form a single component, and having only two output wires. This component has an output up to three hundred times greater than that of a photodiode.

This invention relates to a photosensitive receiving device. It is an object of this invention to provide a photosensitive receiving device having an output such that the device can be used by connection directly to for example a relay, thus avoiding the need for connecting an amplifying circuit and components between a photodiode and a relay.

The use of a photodiode as a transducer for converting light energy into an electric signal is known, but the power output of the photodiode is small and must be amplified to provide a signal of usable strength. This means that in use the photodiode must be connected into an amplifying circuit, in other words various components and wires must be connected together before the photodiode can be used.

According to this invention a photosensitive receiving device comprises a housing having an opening, a photodiode located to receive light through the opening, amplifying means connected to the photodiode, the photodiode and the amplifying means being contained within the housing, and signal output conductors, the whole being constructed as a unitary component. The output current of a device in accordance with the invention may be up to three hundred times greater than that of the photodiode. In one use of the device of the invention, an electromagnetic relay can be directly controlled by a beam of light. The invention is particularly applicable to operation with infrared light, for example as emitted by a Ga As light source. It is preferable that the photodiode be of a kind having a pentode-like characteristic.

The device of the invention offers the equipment manufacturer a saving in design and production costs; it increases reliability since simple and well-tried components can be used; it avoids the need for transmission over a distance of a weak photodiode signal to an amplifier; the stronger output signal of the device is far less subject to interference; and finally the device is strong and not readily damaged in normal use.

An example of a device in accordance with the invention will now be described with reference to the accompanying drawings, in which.

Figure 1:
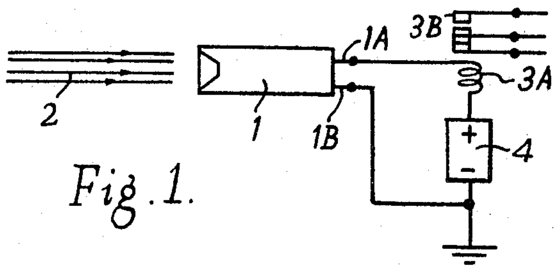
FIGURE 1 is a diagram showing one use of the device.

Referring to FIGURE 1 a photosensitive receiving device 1 in accordance with the invention is shown receiving a beam 2 of infrared light. First and second signal output conductor wires 1A and 1B are connected in series with the coil 3A of a relay, having contacts 3B, and a current source 4. An earth or ground is shown connected to the negative side of the current source 4 and to wire 1B.

Figure 2:
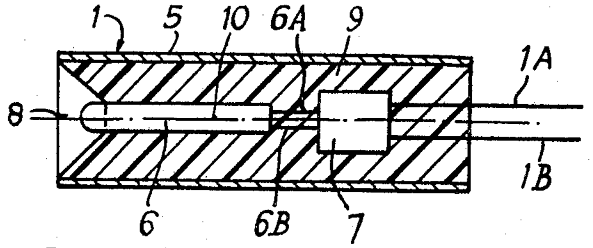
FIGURE 2 is a diagrammatic longitudinal section of the device.

The device 1 is shown in enlarged form in FIGURE 2 and includes a housing 5 in the form of a cylindrical tube (for example one inch in length and one quarter inch in diameter) made of black anodised aluminium. The housing or tube 5 is open at each end, one end constituting a "window" 8 of frusto-conical shape, as shown, through which the light-receiving end of a silicon planar microphotodiode 6 projects. The photodiode 6 has lead-out wires 6A, 6B. The wire 6B is connected to the base of a silicon planar transistor 7. The wire 6A is connected to the wire 1A which is also connected by a wire 7A (FIGURE 3) to the collector of the transistor 7. The emitter of the transistor is connected to the wire 1B. The photodiode 6, transistor 7 and wires 1A, 1B, 6A, 6B and 7A are embedded in epoxy resin 9. The device as a whole is sealed with a black thermosetting resin. As shown the photodiode 6 and transistor 7 are located in spaced relation on the axis 10 of the tube.

Figure 3:
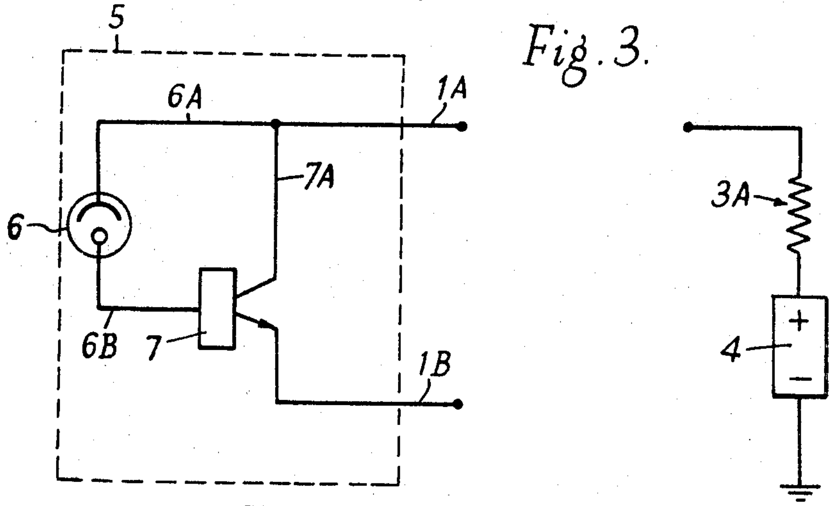
FIGURE 3 is a circuit diagram.

FIGURE 3 shows the electrical circuit, the housing 5 being indicated by dotted lines. If the two output wires 1A and 1B are connected to the series circuit containing the load or coil 3A and current source 4 (for example a battery), in the absence of illumination no significant current flows through the photodiode 6 and the transistor 7 is in the off condition. Apart from a negligible leakage current, no current is delivered to the coil 3A. Upon incidence of light on the photodiode through the window 8 the photodiode conducts, the circuit of the transistor is completed by the base to emitter junction, transistor action occurs, and an output current flows to the coil. Since the photoelectric current of the photodiode is the base current of the transistor, the useful output current into the coil is $(B+1)$ times greater than the photoelectric current, where B is the conventional current gain of the transistor. This output current is of the order of 50 to 300 times greater than the photodiode current.

No passive components are used. The voltage drop in the load has no effect in practice on the sensitivity of the photodiode since the latter is of a kind which has a pentode-like characteristic. The use of such a photodiode, together with the arrangement of the circuit of the device as shown in the left-hand side of FIGURE 3, permits the use of only two signal output conductors, as distinct from a conventional transistor amplifying circuit arrangement which would require three conductors. Thus the device of the invention is, to the user, a single window, two-conductor device.

Figure 4:
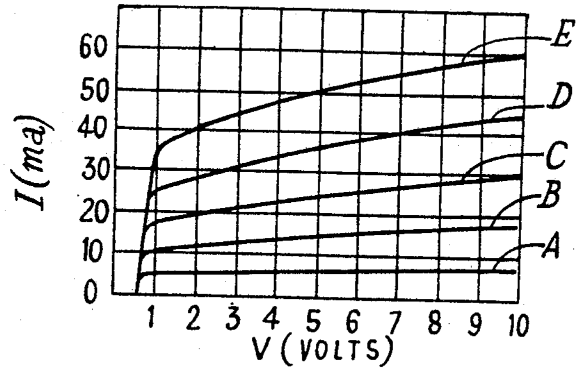
FIGURE 4 is a graph showing output characteristics of the device.

FIGURE 4 is a graph which shows the overall circuit behavior and performance of the device. The five curves A, B, C, D and E correspond respectively to light input intensities (at $\mu$=9000 A.) of 10, 20, 30, 40 and 50 $\mu$w. of input illumination power.

What is claimed is:

1. A photosensitive receiving device comprising a housing having an opening, a photodiode having two output terminals and located to receive light through the opening, a transistor having a base, collector and an emitter, said two terminals being directly conductively connected to said base and collector, respectively, the photodiode and the transistor being contained within the housing, and two signal output conductors directly conductively connected to said emitter and collector, respectively, and extending from said housing, said two conductors being the only two conductive leads in circuit with said photodiode and transistor that extend from said housing, said photodiode, transistor and housing being secured together thereby providing a unitary component having only two external connecting leads.

2. A device according to claim 1 wherein the housing is a cylindrical tube open at least at one end and said one end has said opening through which the photodiode receives light.

3. A device according to claim 1 wherein the photodiode and the transistor, together with said circuit conductors, are embedded in a solid insulating material within the housing, the light receiving end of the photodiode projecting from the insulating material.

4. A device according to claim 1 wherein the housing is of anodised aluminium.

5. A device according to claim 1 wherein the photodiode is a silicon planar microphotodiode.

6. A device according to claim 1 wherein the transistor is a silicon planar transistor.

7. A device according to claim 1 in which said housing includes a thermosetting resin which is opaque and in which said photodiode and transistor are embedded, said photodiode being exposed through a portion of said resin to receive light.

References Cited

UNITED STATES PATENTS

| | | | |
|---|---|---|---|
| 2,636,128 | 4/1953 | Vance | 250—214 |
| 2,737,598 | 3/1956 | Lewis et al. | 250—214 |
| 3,227,929 | 1/1966 | McCreight | 250—239 X |
| 3,349,246 | 12/1967 | Fischer et al. | 250—239 |

JAMES W. LAWRENCE, Primary Examiner

V. LAFRANCHI, Assistant Examiner

U.S. Cl. X.R.

250—211; 315—159